July 25, 1950 R. C. RAYMOND 2,516,529
CAPACITIVE CONNECTION FOR COAXIAL LINES
Filed March 4, 1946
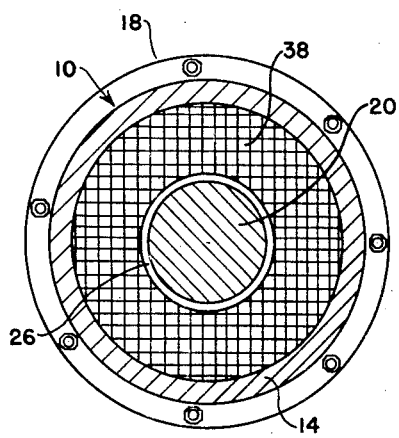
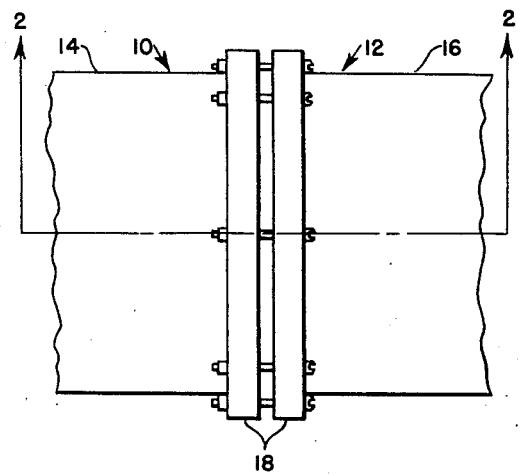
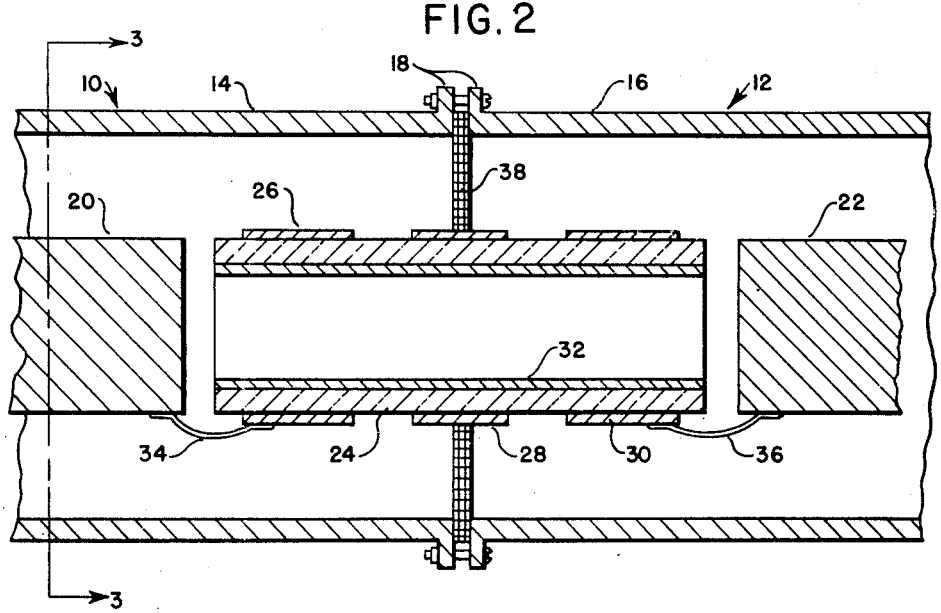
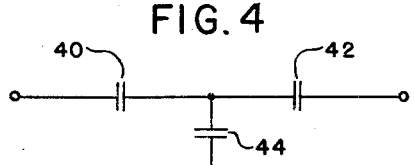
INVENTOR
RICHARD C. RAYMOND
BY
*William D. Hall*
ATTORNEY Patented July 25, 1950

2,516,529

UNITED STATES PATENT OFFICE 2,516,529

CAPACITIVE CONNECTION FOR COAXIAL LINES

Richard C. Raymond, State College, Pa., assignor to the United States of America as represented by the Secretary of War Application March 4, 1946, Serial No. 651,928

3 Claims. (Cl. 178—44)

This invention relates to capacitors and more particularly to capacitors associated with coaxial transmission lines.

It is desirable in high frequency systems to employ coaxial transmission lines in preference to open wire transmission lines, due to the undesirable radiation characteristic of the latter type of transmission line. It is necessary in certain instances to place a filter or capacitor network at the end of a transmission line for the purpose of terminating the line, while in certain other instances it is necessary to place a capacitor network in series with a portion of a transmission line, to provide an impedance match or to obtain a particular electrical characteristic of the line.

It is usually undesirable to construct the above mentioned filter network using conventional capacitors, because such capacitors are not coaxial in nature and hence cause a break in the continuity of the coaxial transmission line with the attendant non-uniformity of current at the ends of the transmission lines. The conventional types of capacitors are also undesirable due to the fact that lead inductance cannot be eliminated.

It is an object of the present invention, therefore, to provide a novel and simple capacitor network ideally adapted for connecting in a coaxial line circuit.

It is a further object of this invention to provide a capacitor network in which the lead inductance is a minimum.

For a better understanding of the invention together with other and further objects thereof, reference is had to the following description taken in connection with the accompanying drawing in which:

Fig. 1 is a plan view of one embodiment of the present invention;

Fig. 2 is a cross-sectional view taken along the line 2—2 of Fig. 1;

Fig. 3 is a view taken along the line 3—3 of Fig. 2; and

Fig. 4 is an equivalent circuit of the embodiment of the invention herein shown.

Referring first to Fig. 1, the illustrated embodiment includes coaxial lines 10 and 12 having outer conductors 14 and 16 clamped together by means of rings 18 and a plurality of bolts.

In Fig. 2 of the drawings, which is a cross-sectional view taken along the line 2—2 of Fig. 1, are shown the outer and inner conductors 14 and 20, respectively, of transmission line 10, and outer and inner conductors 16 and 22, respectively, of transmission line 12. The inner conductors 20 and 22 of the coaxial lines are not conductively connected or continuous but have their ends spaced to provide room therebetween for the capacitor assembly to be described. Mounted within the coaxial lines is a coaxial capacitor assembly comprising a ceramic tube 24 having conductive sleeves 26, 28 and 30 thereon. The inner surface of ceramic tube 24 may be plated with a metal having high conductivity, and this plating is in Fig. 2 represented by the cylindrical tube 32. The ceramic tube here functions as a dielectric having low loss and a high dielectric constant. Sleeves 26, 28 and 30 are preferably made of a material having a high coefficient of conductivity, such as silver. This material may be applied as a plating on the outer surfaces of the sleeves, allowing the remainder of the sleeves to be made of a non-precious metal such as copper. Sleeve 26 is electrically connected to conductor 20 by means of a short lead 34, while sleeve 30 is electrically connected to conductor 22 by a similar short lead 36. A metallic mesh 38 is electrically and mechanically connected to sleeve 28 and thus provides means for supporting the capacitor coaxially within the transmission lines. The outer portion of metal mesh 24 is clamped between the outer conductors 14 and 16 of the two sections of lines 10 and 12 as shown. Where it is desirable to maintain an airtight seal at the junctions of lines 10, the wire mesh 24 may be secured to a metal ring adapted to form a part of the sealing structure.

In Fig. 3, a view taken along the line 3—3 of Fig. 2, are visible the inner conductor 20 of coaxial line 10, the metal sleeve 26, and the metal mesh 38 of the described structure.

The operation of this invention may be best understood by reference to the equivalent circuit shown in Fig. 4 of the drawings. The circuit shown in Fig. 4 is a four-terminal T network made up of capacitors 40, 42 and 44. This type of network will be recognized as a type of filter network that finds many useful applications in high frequency work. The plates of capacitors 40, 42 and 44 of Fig. 4 that are connected together correspond to the innermost conductive tube 38 of Fig. 2. The other plates of each of the three capacitors 40, 42 and 44 correspond to the rings or tubes 26, 28 and 30, respectively. The metal mesh shown in Figs. 2 and 3 provides the electrical connection between ring 28 and outer conductors 14 and 16 of coaxial lines 10 and 12, corresponding, in Fig. 4, to the connection between the lower plate of the capacitor 44 and the two network terminals connected thereto.

The condenser network structure herein described possesses the following advantages:

1. It is coaxial in nature and hence is ideally suited for use in coaxial line systems.
2. The lead inductance between the individual capacitors, and between the capacitors and the transmission lines, is very low.
3. The capacitor network may be constructed in a single unit that is mechanically rugged.
4. There is very little loss at high frequencies due to the low loss dielectric material and highly conductive plate material making up the capacitors.
5. The unit does not interfere with the normal pressurizing of the line.

While but one embodiment of the invention has been here described, it will be obvious to those skilled in the art that various changes and modifications may be made therein to adapt it for use in a wide variety of circuits. Such changes and modifications are considered to fall fairly within the scope of the invention as defined in the claims.

What is claimed is:

1. A coaxial capacitive network comprising a first and a second coaxial transmission line, clamping means mechanically and electrically joining the outer conductors of said first and second coaxial lines, a hollow ceramic cylinder having a metallic plating on the inner surface thereof, a plurality of metallic sleeves mounted on said ceramic tube, means supporting said hollow ceramic cylinder within said coaxial lines and in coaxial alignment therewith, means electrically connecting at least one of said metallic sleeves to the outer conductors of said coaxial lines, means connecting at least one other of said sleeves to the inner conductor of said first coaxial line, and means electrically connecting at least one of the remainder of said sleeves to the inner conductor of said second coaxial line.

2. A capacitive network comprising a first and a second section of coaxial line, clamping means joining the outer conductors of said first and second coaxial lines, a hollow dielectric cylinder having a metallic coating on the inner surface, thereof, means supporting said hollow dielectric cylinder within at least one of the said transmission lines, a plurality of metallic sleeves mounted on said hollow dielectric cylinder, means electrically connecting one of said sleeves to said joined outer conductors of said two coaxial lines, means connecting another of said sleeves to the inner conductor of said first coaxial line, and means connecting the other of said sleeves to the inner conductor of said second coaxial line.

3. A coaxial capacitive network comprising first and second sections of coaxial line each having an inner conductor and an outer conductor, said outer conductors being mechanically and electrically connected at their opposed ends, a hollow dielectric cylinder having on its inner surface a plating of a high conductivity metal, at least three metallic rings mounted on the outer surface of said dielectric cylinder, means to support said dielectric cylinder within said coaxial lines, between and coaxially with the inner conductors of said first and second coaxial line sections, said means comprising a metal mesh connected between said outer conductors and one of said metallic rings, low inductance means to electrically connect a second of said rings to the first coaxial line inner conductor, and low inductance means to electrically connect a third of said rings to the second coaxial line inner conductor.

RICHARD C. RAYMOND.

REFERENCES CITED

The following references are of record in the file of this patent:

UNITED STATES PATENTS

| Number | Name | Date |
|---|---|---|
| 248,742 | Henck | Oct. 25, 1881 |
| 2,030,179 | Potter | Feb. 11, 1936 |
| 2,149,356 | Mason | Mar. 7, 1939 |
| 2,171,219 | Malter | Aug. 29, 1939 |
| 2,401,344 | Espley | June 4, 1946 |

FOREIGN PATENTS

| Number | Country | Date |
|---|---|---|
| 474,754 | Great Britain | Nov. 5, 1937 |
| 524,435 | Great Britain | Aug. 6, 1940 |